(12) United States Patent
Choi et al.

(10) Patent No.: US 12,189,819 B2
(45) Date of Patent: *Jan. 7, 2025

(54) METHOD AND APPARATUS FOR DE-IDENTIFICATION OF PERSONAL INFORMATION

(71) Applicant: FASOO CO., LTD., Seoul (KR)

(72) Inventors: Dae Woo Choi, Seoul (KR); Woo Seok Kwon, Seoul (KR); Myeong Sik Hwang, Seoul (KR); Sang Wook Kim, Seoul (KR); Gi Tae Kim, Seoul (KR)

(73) Assignee: Fasoo, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,630

(22) Filed: May 14, 2022

(65) Prior Publication Data
US 2022/0277106 A1    Sep. 1, 2022

Related U.S. Application Data

(63) Continuation of application No. 16/314,202, filed as application No. PCT/KR2017/006765 on Jun. 27, 2017, now Pat. No. 11,354,436.

(30) Foreign Application Priority Data

| Jun. 30, 2016 | (KR) | 10-2016-0082839 |
| Jun. 30, 2016 | (KR) | 10-2016-0082860 |
| Jun. 30, 2016 | (KR) | 10-2016-0082878 |

(51) Int. Cl.
*G06F 21/62* (2013.01)
*G06F 16/00* (2019.01)
*G06F 16/23* (2019.01)

(52) U.S. Cl.
CPC .......... *G06F 21/6254* (2013.01); *G06F 16/00* (2019.01); *G06F 16/2379* (2019.01); *G06F 21/62* (2013.01)

(58) Field of Classification Search
CPC .. G06F 21/6254; G06F 16/2379; G06F 16/00; G06F 21/62; G06F 21/60; G06F 21/6245; H04W 12/02
See application file for complete search history.

(56) References Cited

U.S. PATENT DOCUMENTS

| 9,600,673 | B2 | 3/2017 | Chen |
| 2002/0169793 | A1 | 11/2002 | Sweeney |

(Continued)

FOREIGN PATENT DOCUMENTS

| JP | 2011-113285 | 6/2011 |
| JP | 2013-080375 | 5/2013 |

(Continued)

OTHER PUBLICATIONS

Khaled El Eman et al., A Globally Optimal k-Anonymity Method for the De-Identification of Health Data, Journal of the American Medical Informatics Association, Sep./Oct. 2009, pp. 670-682, vol. 16, No. 5, United States.

(Continued)

*Primary Examiner* — Malcolm Cribbs
(74) *Attorney, Agent, or Firm* — AJU IP Global PLLC

(57) ABSTRACT

Disclosed are a method and an apparatus for de-identification of personal information. The method for de-identification of personal information comprises the steps of: obtaining, from a database, a raw table including records in which raw data indicating the personal information is recorded; generating generalized data by generalizing the raw data recorded in each of the records included in the raw table; setting a generalized hierarchical model consisting of the raw data and the generalized data; generating a raw lattice including a plurality of candidate nodes on the basis of the generalized hierarchical model; and setting, from among the plurality of candidate nodes included in the raw lattice, a final lattice including at least one candidate node satisfying a predetermined criterion. Thus, it is possible for the personal information to be efficiently de-identified.

15 Claims, 11 Drawing Sheets

(56) References Cited

U.S. PATENT DOCUMENTS

| | | |
|---|---|---|
| 2007/0255704 A1 | 11/2007 | Baek |
| 2010/0077006 A1 | 3/2010 | El Emam |
| 2010/0332537 A1 | 12/2010 | El Emam |
| 2013/0138698 A1 | 5/2013 | Harada |
| 2015/0007249 A1* | 1/2015 | Bezzi ................ G06F 21/6227 726/1 |
| 2016/0154978 A1* | 6/2016 | Baker ................ G06F 16/285 726/26 |
| 2018/0114037 A1 | 4/2018 | Scaiano |

FOREIGN PATENT DOCUMENTS

| | | |
|---|---|---|
| JP | 2013-161428 | 8/2013 |
| WO | 2008-069011 | 6/2008 |
| WO | 2011-145401 | 11/2011 |

OTHER PUBLICATIONS

Koji Sedna, Revision of the Personal Information Protection Law and new trends in data science Anonymization technology that reduces the risk of individual identification, Communications of the Operations Research Society of Japan, 2016, pp. 1-11, vol. 61, No. 5, Japan.

Florian Kohlmayer et al., Flash: Efficient, Stable and Optimal K-Anonymity, 2012 ASE/IEEE International Conference on Social Computing and 2012 ASE/IEEE International Conference on Privacy, Security, Risk and Trust, Sep. 3-5, 2012, Amsterdam, Netherlands.

* cited by examiner

| SEQUECE | RESIDENTIAL REGISTRATION NUMBER | NAME | ADDRESS | POSTAL CODE NUMBER | AGE | NATIONALITY | SEX | DISEASE |
|---|---|---|---|---|---|---|---|---|
| 1 | 123456-7895135 | KIM KILDONG | 123 NA-DONG, A-GU, SEOUL | 13053 | 28 | JAPAN | MALE | GASTRITIS |
| 2 | 123456-9875312 | LEE KILDONG | 456 GA-DONG, B-GU, SEOUL | 13068 | 29 | KOREA | FEMALE | GASTRITIS |
| 3 | 123456-5638726 | CHOI KILDONG | 789 DA-DONG, B-GU, SEOUL | 13068 | 21 | ENGLAND | FEMALE | BRONCHITIS |
| 4 | 123456-4568790 | YU KILDONG | 234 GA-DONG, E-GU, SEOUL | 13053 | 23 | KOREA | MALE | BRONCHITIS |
| 5 | 123456-6987539 | SEO KILDONG | 678 LA-DONG, A-GU, SEOUL | 14853 | 50 | GERMANY | FEMALE | PNEUMONITIS |
| 6 | 123456-8987358 | HONG KILDONG | 123 NA-DONG, D-GU, SEOUL | 14853 | 55 | JAPAN | MALE | GASTRITIS |
| 7 | 123456-8799871 | BAK KILDONG | 456, MA-DONG, B-BU, SEOUL | 14850 | 47 | KOREA | MALE | BRONCHITIS |
| 8 | 123456-6571215 | SIN KILDONG | 789, GA-DONG, C-GU, SEOUL | 14850 | 49 | KOREA | FEMALE | BRONCHITIS |
| 9 | 123456-6112387 | JEON KILDONG | 567, DA-DONG, A-GU, SEOUL | 13053 | 31 | KOREA | MALE | PNEUMONITIS |
| 10 | 123456-4125796 | SIM KILDONG | 126, GA-DONG, B-GU, SEOUL | 13053 | 37 | GERMANY | MALE | PNEUMONITIS |
| 11 | 123456-4698726 | BONG KILDONG | 579, LA-DONG, C-GU, SEOUL | 13068 | 36 | ENGLAND | FEMALE | PNEUMONITIS |
| 12 | 123456-5638793 | JIN KILDONG | 351, DA-DONG, E-GU, SEOUL | 13068 | 35 | KOREA | FEMALE | PNEUMONITIS |

| | SEQUECE | POSTAL CODE NUMBER | AGE | NATIONALITY | SEX | DISEASE |
|---|---|---|---|---|---|---|
| EQUIVALENCE CLASS-1 | 1 | 130** | <30 | ** | * | GASTRITIS |
| | 2 | 130** | <30 | ** | * | GASTRITIS |
| | 3 | 130** | <30 | ** | * | BRONCHITIS |
| | 4 | 130** | <30 | ** | * | BRONCHITIS |
| EQUIVALENCE CLASS-2 | 5 | 1485* | ≥40 | ** | * | PNEUMONITIS |
| | 6 | 1485* | ≥40 | ** | * | GASTRITIS |
| | 7 | 1485* | ≥40 | ** | * | BRONCHITIS |
| | 8 | 1485* | ≥40 | ** | * | BRONCHITIS |
| EQUIVALENCE CLASS-3 | 9 | 130** | 3* | ** | * | PNEUMONITIS |
| | 10 | 130** | 3* | ** | * | PNEUMONITIS |
| | 11 | 130** | 3* | ** | * | PNEUMONITIS |
| | 12 | 130** | 3* | ** | * | PNEUMONITIS |

| | SEQUECE | POSTAL CODE NUMBER | AGE | NATIONALITY | SEX | DISEASE |
|---|---|---|---|---|---|---|
| EQUIVALENCE CLASS-1 | 1 | 130** | <40 | ** | * | GASTRITIS |
| | 4 | 130** | <40 | ** | * | BRONCHITIS |
| | 9 | 130** | <40 | ** | * | PNEUMONITIS |
| | 10 | 130** | <40 | ** | * | PNEUMONITIS |
| EQUIVALENCE CLASS-2 | 5 | 1485* | ≥40 | ** | * | PNEUMONITIS |
| | 6 | 1485* | ≥40 | ** | * | GASTRITIS |
| | 7 | 1485* | ≥40 | ** | * | BRONCHITIS |
| | 8 | 1485* | ≥40 | ** | * | BRONCHITIS |
| EQUIVALENCE CLASS-3 | 2 | 130** | <40 | ** | * | GASTRITIS |
| | 3 | 130** | <40 | ** | * | BRONCHITIS |
| | 11 | 130** | <40 | ** | * | PNEUMONITIS |
| | 12 | 130** | <40 | ** | * | PNEUMONITIS |

| SEQUECE | RESIDENTIAL REGISTRATION NUMBER | NAME | ADDRESS | POSTAL CODE NUMBER | AGE | NATIONALITY | SEX | DISEASE |
|---|---|---|---|---|---|---|---|---|
| 1 | 123456-******** | *** | SEOUL ** ** *** | 13053 | 28 | JAPAN | MALE | GASTRITIS |
| 2 | 123456-******** | *** | SEOUL ** ** *** | 13068 | 29 | KOREA | FEMALE | GASTRITIS |
| 3 | 123456-******** | *** | SEOUL ** ** *** | 13068 | 21 | ENGLAND | FEMALE | BRONCHITIS |
| 4 | 123456-******** | *** | SEOUL ** ** *** | 13053 | 23 | KOREA | MALE | BRONCHITIS |
| 5 | 123456-******** | *** | SEOUL ** ** *** | 14853 | 50 | GERMANY | FEMALE | PNEUMONITIS |
| 6 | 123456-******** | *** | SEOUL ** ** *** | 14853 | 55 | JAPAN | MALE | GASTRITIS |
| 7 | 123456-******** | *** | SEOUL ** ** *** | 14850 | 47 | KOREA | MALE | BRONCHITIS |
| 8 | 123456-******** | *** | SEOUL ** ** *** | 14850 | 49 | KOREA | FEMALE | BRONCHITIS |
| 9 | 123456-******** | *** | SEOUL ** ** *** | 13053 | 31 | KOREA | MALE | PNEUMONITIS |
| 10 | 123456-******** | *** | SEOUL ** ** *** | 13053 | 37 | GERMANY | MALE | PNEUMONITIS |
| 11 | 123456-******** | *** | SEOUL ** ** *** | 13068 | 36 | ENGLAND | FEMALE | PNEUMONITIS |
| 12 | 123456-******** | *** | SEOUL ** ** *** | 13068 | 35 | KOREA | FEMALE | PNEUMONITIS |

METHOD AND APPARATUS FOR DE-IDENTIFICATION OF PERSONAL INFORMATION

The present application is a continuation of U.S. patent application Ser. No. 16/314,202 (filed Jan. 30, 2019), which is a U.S. National Stage Patent Application of PCT Patent Application No. PCT/KR2017/006765 (filed Jun. 27, 2017), which claims priority to Korean Patent Application No. 10-2016-0082839 (filed on Jun. 30, 2016), Korean Patent Application No. 10-2016-0082860 (filed on Jun. 30, 2016), and Korean Patent Application No. 10-2016-0082878 (filed on Jun. 30, 2016), which are all hereby incorporated by reference in their entireties.

TECHNICAL FIELD

The present invention relates to a data processing technology, and more particularly, to a technology for efficiently de-identifying a table including personal information on the basis of a genetic algorithm.

BACKGROUND ART

With the development of information and communication technology (e.g., technologies related to big data), a technique for collecting personal information, a technique for analyzing collected personal data, etc. are under development. Personal information may include a resident registration number, an address, a postal code number, a name, a birthdate, a disease, a sex, an annual income, and the like. Due to such development of technologies related to big data, personal information may be used in various fields. For example, companies may advertise their products, services, etc. to specific consumers on the basis of personal information, and accordingly, consumers may easily acquire information on desired products and services from companies.

However, personal information may be thoughtlessly used, and fundamental rights of a person, who is an information subject, may be infringed accordingly. To solve this problem, a personal information de-identification technique may be taken into consideration. The de-identification technique denotes a technique for deleting or substituting (i.e., generalizing data indicating personal information) some or all of personal information and thereby making it impossible to identify a specific individual even when the personal information is combined with other information. When personal information is de-identified, a range in which personal information is generalized may vary according to a generalization level. When personal information is de-identified at every generalization level, long time may be required to generate de-identified personal information.

Also, the utility, re-identification risk, etc. of personal information may vary according to a generalization level. For example, when a relatively large portion of personal information is generalized, a relatively large number of errors may occur upon analysis of the de-identified personal information, and the utility of the de-identified personal information may be degraded accordingly. On the other hand, when a relatively small portion of personal information is generalized, the de-identified personal information may be inferred or re-identified relatively easily, and the risk of re-identification of the de-identified personal information may be increased accordingly.

Further, in order to de-identify personal information, it is first necessary to acquire a table including personal information from a database. A table acquired from a database includes many and various pieces of information, and long time may be required to generate a table including necessary information.

DISCLOSURE

Technical Problem

To solve the aforementioned problems, the present invention is directed to providing an apparatus and method for efficiently de-identifying personal information.

The present invention is also directed to providing an apparatus and method for setting up the attributes of records of a table including personal information.

Technical Solution

One aspect of the present invention provides a personal information de-identification method performed by a personal information de-identification apparatus, the method including acquiring an original table including records in which original data indicating personal information is recorded from a database, generating generalized data by generalizing the original data recorded in the respective records included in the original table on the basis of generalization levels, setting up a generalization hierarchy model composed of the original data and the generalized data, generating an original lattice including a plurality of candidate nodes indicating tables, which indicate generalization levels for types of personal information, on the basis of a hierarchical structure indicated by the generalization hierarchy model, and setting up a final lattice including one or more candidate nodes which satisfy a preset requirement among the plurality of candidate nodes included in the original lattice.

The personal information de-identification method may further include setting up attributes of the respective records included in the original table.

The attributes may be classified as identifier (ID), quasi-identifier (QI), sensitive attribute (SA), and insensitive attribute (IA). A record in which original data indicating personal information whereby a specific individual is explicitly identified is recorded may be set to ID, a record in which original data indicating personal information whereby a specific individual is inexplicitly identified is recorded may be set to QI, a record in which original data indicating personal information having a sensitivity of a preset reference value or more is recorded may be set to SA, and a record in which original data indicating personal information having a lower sensitivity than SA is recorded may be set to IA.

The personal information de-identification method may further include masking records whose attributes have been set to ID among the records included in the original table.

The personal information de-identification method may further include setting up the generalization levels according to types of personal information indicated by original data recorded in records whose attributes have been set to QI among the records included in the original table.

Original data recorded in records whose attributes have been set to QI among the records included in the table may be generalized on the basis of a generalization level.

The setting up of the final lattice may include selecting one or more candidate nodes from among the plurality of candidate nodes included in the original lattice, generating de-identified tables by de-identifying the original table on the basis of generalization levels indicated by the one or more candidate nodes, setting a candidate node corresponding to a de-identified table satisfying a preset suppression requirement to a final node, and setting up the final lattice including the final node corresponding to the candidate node satisfying the preset requirement.

The de-identified table may be generated on the basis of K-anonymity, generated on the basis of K-anonymity and L-diversity, or generated on the basis of K-anonymity and T-closeness.

The preset suppression requirement may indicate a ratio of equivalence classes which do not satisfy a preset K-anonymity to equivalence classes constituting the de-identified table.

The personal information de-identification method may further include calculating a re-identification risk and a utility of a de-identified table corresponding to at least one final node included in the final lattice.

Another aspect of the present invention provides a personal information de-identification apparatus including a processor and a memory configured to store at least one command executed by the processor. The at least one command is executable to acquire an original table including records in which original data indicating personal information is recorded from a database, generate generalized data by generalizing the original data recorded in the respective records included in the original table on the basis of generalization levels, set up a generalization hierarchy model composed of the original data and the generalized data, generate an original lattice including a plurality of candidate nodes indicating tables, which indicate generalization levels for types of personal information, on the basis of a hierarchical structure indicated by the generalization hierarchy model, and set up a final lattice including one or more candidate nodes which satisfy a preset requirement among the plurality of candidate nodes included in the original lattice.

The at least one command may be further executable to set up attributes of the respective records included in the original table.

The attributes may be classified as ID, QI, SA, and IA. A record in which original data indicating personal information whereby a specific individual is explicitly identified is recorded may be set to ID, a record in which original data indicating personal information whereby a specific individual is inexplicitly identified is recorded may be set to QI, a record in which original data indicating personal information having a sensitivity of a preset reference value or more is recorded may be set to SA, and a record in which original data indicating personal information having a lower sensitivity than SA is recorded may be set to IA.

The at least one command may be further executable to mask records whose attributes have been set to ID among the records included in the original table.

The at least one command may be further executable to set up the generalization levels according to types of personal information indicated by original data recorded in records whose attributes have been set to QI among the records included in the original table.

Original data recorded in records whose attributes have been set to QI among the records included in the table may be generalized on the basis of a generalization level.

In the case of setting up the final lattice, the at least one command may be executable to select one or more candidate nodes from among the plurality of candidate nodes included in the original lattice, generate de-identified tables by de-identifying the original table on the basis of generalization levels indicated by the one or more candidate nodes, set a candidate node corresponding to a de-identified table satisfying a preset suppression requirement to a final node, and set the final lattice including the final node corresponding to the candidate node satisfying the preset requirement.

The de-identified table may be generated on the basis of K-anonymity, generated on the basis of K-anonymity and L-diversity, or generated on the basis of K-anonymity and T-closeness.

The preset suppression requirement may indicate a ratio of equivalence classes which do not satisfy a preset K-anonymity to equivalence classes constituting the de-identified table.

The at least one command may be further executable to calculate a re-identification risk and a utility of a de-identified table corresponding to at least one final node included in the final lattice.

Another aspect of the present invention provides a personal information de-identification method performed by a personal information de-identification apparatus, the method including generating an original lattice including a plurality of hierarchies composed of at least one node indicating generalization levels for types of personal information on the basis of generalization levels for types of personal information indicated by original data recorded in records included in an original table, setting an arbitrary node belonging to hierarchy-n and an arbitrary node belonging to hierarchy-m among the plurality of hierarchies respectively to selection node-1 and selection node-2, setting respective arbitrary nodes belonging to the original lattice to a cross node and a variation node on the basis of results of comparing suppression value ratios of de-identified tables separately corresponding to selection node-1 and selection node-2 with a preset suppression threshold value, and setting a final lattice composed of nodes corresponding to de-identified tables having a suppress value ratio of the preset suppress threshold value or less among selection node-1, selection node-2, the cross node, and the variation node. N and m are natural numbers, the de-identified tables are results of de-identifying the original table on the basis of data corresponding to generalization levels indicated by the nodes, and the suppress value ratio is a ratio of equivalence classes which do not satisfy a preset K-anonymity to equivalence classes constituting the de-identified tables.

In the original lattice, selection node-1 may be connected to selection node-2. Hierarchy-n may be a hierarchy at $2/3$ height from a lowest hierarchy among the plurality of hierarchies of the original lattice, and hierarchy-m may be a hierarchy at $1/3$ height from the lowest hierarchy among the plurality of hierarchies of the original lattice.

When the suppression value ratios of the de-identified tables separately corresponding to selection node-1 and selection node-2 are the preset suppression threshold value or less, the cross node may be set to an arbitrary node belonging to a hierarchy at $1/2$ height between hierarchy-m and the lowest hierarchy among the plurality of hierarchies, and the variation node may be set to an arbitrary node other than selection node-2 among nodes belonging to hierarchy-m among the plurality of hierarchies.

When the suppression value ratio of the de-identified table corresponding to selection node-1 is the preset suppression threshold value or less and the suppression value ratio of the de-identified table corresponding to selection node-2 exceeds the preset suppression threshold value, the cross node may be set to an arbitrary node belonging to a hierarchy at $1/2$ height between hierarchy-n and hierarchy-m among the plurality of hierarchies, and the variation node may be set to an arbitrary node other than selection node-1 among nodes belonging to hierarchy-n among the plurality of hierarchies.

When the suppression value ratios of the de-identified tables separately corresponding to selection node-1 and selection node-2 exceed the preset suppression threshold value, the cross node may be set to an arbitrary node belonging to a hierarchy at ½ height between hierarchy-n and a highest hierarchy among the plurality of hierarchies, and the variation node may be set to an arbitrary node other than selection node-1 among nodes belonging to hierarchy-n among the plurality of hierarchies.

The number of nodes constituting the final lattice may be greater than or equal to x times the number of nodes belonging to a hierarchy including the largest number of nodes among the plurality of hierarchies, and x may be a real number greater than 0.

Another aspect of the present invention provides a personal information de-identification apparatus including a processor and a memory configured to store at least one command executed by the processor. The at least one command is executable to generate an original lattice including a plurality of hierarchies composed of at least one node indicating generalization levels for types of personal information on the basis of generalization levels for types of personal information indicated by original data recorded in records included in an original table, set an arbitrary node belonging to hierarchy-n among the plurality of hierarchies to selection node-1, set an arbitrary node belonging to hierarchy-m to selection node-2, set respective arbitrary nodes belonging to the original lattice to a cross node and a variation node on the basis of results of comparing suppression value ratios of de-identified tables separately corresponding to selection node-1 and selection node-2 with a preset suppression threshold value, and set a final lattice composed of nodes corresponding to de-identified tables having a suppress value ratio of the preset suppress threshold value or less among selection node-1, selection node-2, the cross node, and the variation node. N and m are natural numbers, the de-identified tables are results of de-identifying the original table on the basis of data corresponding to generalization levels indicated by the nodes, and the suppress value ratio is a ratio of original data, which is set to a suppression value so as to generate the de-identified tables, to the original data recorded in the records of the original table.

In the original lattice, selection node-1 may be connected to selection node-2. Hierarchy-n may be a hierarchy at ⅔ height from a lowest hierarchy among the plurality of hierarchies of the original lattice, and hierarchy-m may be a hierarchy at ⅓ height from the lowest hierarchy among the plurality of hierarchies of the original lattice.

When the suppression value ratios of the de-identified tables separately corresponding to selection node-1 and selection node-2 are the preset suppression threshold value or less, the cross node may be set to an arbitrary node belonging to a hierarchy at ½ height between hierarchy-m and the lowest hierarchy among the plurality of hierarchies, and the variation node may be set to an arbitrary node other than selection node-2 among nodes belonging to hierarchy-m among the plurality of hierarchies.

When the suppression value ratio of the de-identified table corresponding to selection node-1 is the preset suppression threshold value or less and the suppression value ratio of the de-identified table corresponding to selection node-2 exceeds the preset suppression threshold value, the cross node may be set to an arbitrary node belonging to a hierarchy at ½ height between hierarchy-n and hierarchy-m among the plurality of hierarchies, and the variation node may be set to an arbitrary node other than selection node-1 among nodes belonging to hierarchy-n among the plurality of hierarchies.

When the suppression value ratios of the de-identified tables separately corresponding to selection node-1 and selection node-2 exceed the preset suppression threshold value, the cross node may be set to an arbitrary node belonging to a hierarchy at ½ height between hierarchy-n and a highest hierarchy among the plurality of hierarchies, and the variation node may be set to an arbitrary node other than selection node-1 among nodes belonging to hierarchy-n among the plurality of hierarchies.

The number of nodes constituting the final lattice may be greater than or equal to x times the number of nodes belonging to a hierarchy including the largest number of nodes among the plurality of hierarchies, and x may be a real number greater than 0.

Another aspect of the present invention provides a method of setting up attributes of records of a table including personal information, the method being performed by a personal information de-identification apparatus and including setting up a regular expression used to search for the personal information and set up attributes of records, setting up a search target range of the table, searching for the personal information within a section of the table indicated by the search target range on the basis of the regular expression, and setting up attributes of records in which the personal information has been recorded on the basis of the regular expression.

The search target range may indicate the number of records constituting the table.

The table may further include non-personal information, and the regular expression may be used to search for the non-personal information and set up attributes of records in which the non-personal information has been recorded.

The attributes of the records may be classified as ID, QI, SA, and IA.

The setting up of the attributes of the records may include setting an attribute of a record in which original data indicating personal information whereby a specific individual is explicitly identified is recorded to ID, setting an attribute of a record in which original data indicating personal information whereby a specific individual is inexplicitly identified is recorded to QI, setting an attribute of a record in which original data indicating personal information having a sensitivity of a preset reference value or higher is recorded to SA, and setting an attribute of a record in which original data indicating personal information having a lower sensitivity than SA is recorded to IA.

The method of setting up attributes of records may further include determining whether to mask personal information recorded in records having an attribute of ID.

Another aspect of the present invention provides a personal information de-identification apparatus including a processor and a memory configured to store at least one command executed by the processor. The at least one command is executable to set up a regular expression used to search for personal information and set up attributes of records of a table including the personal information, set up a search target range of the table, search for the personal information within a section of the table indicated by the search target range on the basis of the regular expression, and set up attributes of records in which the personal information has been recorded on the basis of the regular expression.

The search target range may indicate the number of records constituting the table.

The table may further include non-personal information, and the regular expression may be used to search for the non-personal information and set up attributes of records in which the non-personal information has been recorded.

The attributes of the records may be classified as ID, QI, SA, and IA.

In the case of setting up the attributes of the records, the at least one command may be executable to set an attribute of a record in which original data indicating personal information whereby a specific individual is explicitly identified is recorded to ID, set an attribute of a record in which original data indicating personal information whereby a specific individual is inexplicitly identified is recorded to QI, set an attribute of a record in which original data indicating personal information having a sensitivity of a preset reference value or higher is recorded to SA, and set an attribute of a record in which original data indicating personal information having a lower sensitivity than SA is recorded to IA.

The at least one command may be further executable to determine whether to mask personal information recorded in records having an attribute of ID.

Advantageous Effects

According to the present invention, since personal information corresponding a generalization level satisfying a preset requirement is de-identified, a non-identification procedure may be rapidly performed. Also, the utility of de-identified personal information may be improved, and the re-identification risk of de-identified personal information may be reduced (or the re-identification risk of personal information may be removed).

Also, personal information may be de-identified in consideration of a user's data type, purpose of use, etc., and the utility of de-identified personal information may be further improved. Since a genetic algorithm is used to de-identify personal information, de-identification of personal information may be rapidly performed.

Further, attributes of records of a table including personal information may be efficiently (or rapidly) set up. Therefore, de-identification of personal information may be rapidly performed.

DESCRIPTION OF DRAWINGS

FIG. 4 is a conceptual diagram showing an exemplary embodiment of a table.

FIG. 10 is a conceptual diagram showing an exemplary embodiment of a de-identified table.

FIG. 11 is a conceptual diagram showing another exemplary embodiment of a de-identified table.

FIG. 14 is a conceptual diagram showing an exemplary embodiment of a table including masked records.

BEST MODE

Figure 1:
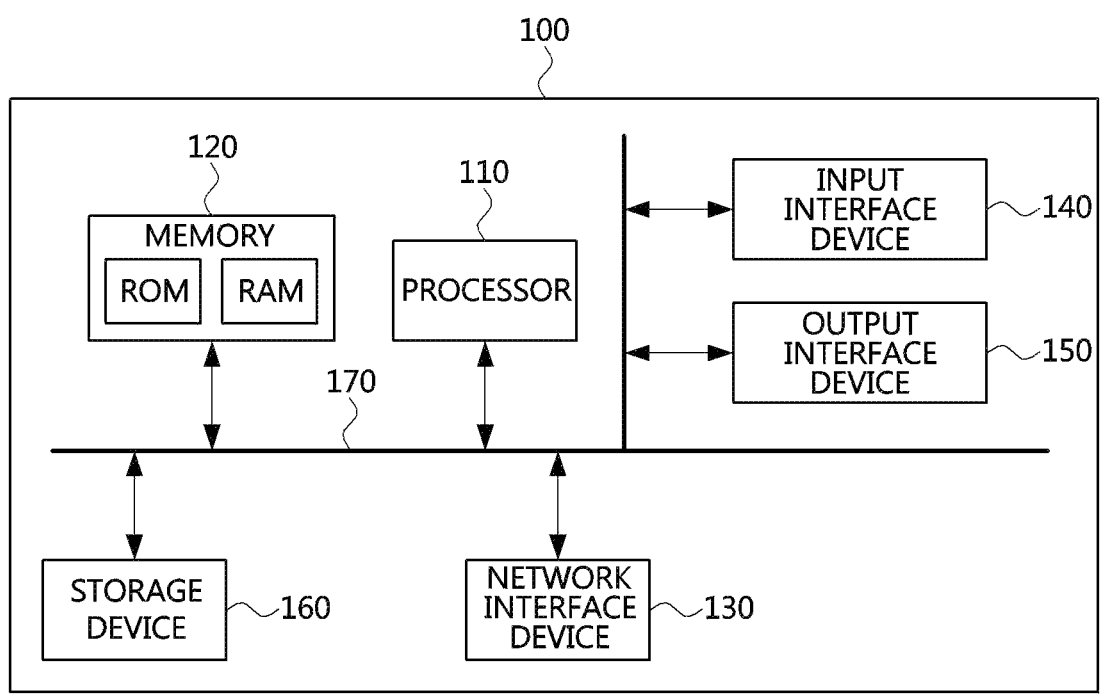
FIG. 1 is a block diagram showing an exemplary embodiment of a personal information de-identification apparatus which performs methods of the present invention.

According to an exemplary embodiment of the present invention for achieving the above objectives, a personal information de-identification method performed by a personal information de-identification apparatus includes acquiring an original table including records in which original data indicating personal information is recorded from a database, generating generalized data by generalizing the original data recorded in the respective records included in the original table on the basis of generalization levels, setting up a generalization hierarchy model composed of the original data and the generalized data, generating an original lattice including a plurality of candidate nodes indicating tables, which indicate generalization levels for types of personal information, on the basis of a hierarchical structure indicated by the generalization hierarchy model, and setting up a final lattice including one or more candidate nodes which satisfy a preset requirement among the plurality of candidate nodes included in the original lattice.

DETAILED DESCRIPTION

While the present invention is susceptible to various modifications and may have several embodiments, specific embodiments thereof will be shown in the drawings and described in detail. It should be understood, however, that it is not intended to limit the invention to the particular forms, but on the contrary, the intention is to cover all modifications, equivalents, and alternatives falling within the spirit and technical scope of the invention.

The terms "first," "second," and the like may be used to describe various elements, but the elements are not limited by the terms. The terms are only used to distinguish one element from another element. For example, a first element may be termed a second element, and similarly, a second element may also be termed a first element, without departing from the scope of the present invention. The term "and/or" includes any and all combinations of one or more associated items.

It should be understood that when an element is referred to as being "connected" or "coupled" to another element, the element may be directly connected or coupled to the other element or intervening elements may be present. On the other hand, when an element is referred to as being "directly connected" or "directly coupled" to another element, there are no intervening elements present.

Terminology used herein is for the purpose of describing particular embodiments only and is not intended to be limiting of the present invention. The singular forms include the plural forms as well unless the context clearly indicates otherwise. It should be understood that the terms "include," "have," or the like, when used herein, specify the presence of stated features, integers, steps, operations, elements, parts, or combinations thereof, but do not preclude the presence or addition of one or more features, integers, steps, operations, elements, parts, or combinations thereof.

Unless otherwise defined, all terms including technical and scientific terms used herein have the same meaning as commonly understood by those of ordinary skill in the art to which the present invention pertains. It will be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, exemplary embodiments of the present invention will be described in detail with reference to the accompanying drawings. In the following description, to assist with the overall understanding of the present invention, like numbers refer to like elements throughout the drawings, and a repetitive description on the same element is not provided.

FIG. 1 is a block diagram showing an exemplary embodiment of a personal information de-identification apparatus which performs methods of the present invention.

Referring to FIG. 1, a personal information de-identification apparatus 100 may include at least one processor 110 and a memory 120. Also, the personal information de-identification apparatus 100 may further include a network interface device 130 which is connected to a network and perform communication, an input interface device 140, an output interface device 150, a storage device 160, and the like. The respective elements included in the personal information de-identification apparatus 100 may be connected via a bus 170 and communicate with each other. The personal information de-identification apparatus 100 may be simply referred to as "de-identification apparatus 100."

The processor 110 may execute a program command stored in the memory 120 and/or the storage device 160. The processor 110 may be a central processing unit (CPU), a graphics processing unit (GPU), or a dedicate processor for performing methods according to the present invention. The memory 120 and the storage device 160 may be a volatile storage medium and/or a non-volatile storage medium. For example, the memory 120 may be a read-only memory (ROM) and/or a random access memory (RAM).

The de-identification apparatus 100 may be a desktop computer, a laptop computer, a tablet personal computer (PC), a wireless phone, a mobile phone, a smart phone, and the like.

Meanwhile, when a method (e.g., transmission or reception of a signal) performed by the de-identification apparatus 100 is described, another apparatus corresponding thereto may perform a method (e.g., reception or transmission of the signal) corresponding to the method performed by the de-identification apparatus 100. In other words, when an operation of the de-identification apparatus 100 is described, another apparatus corresponding to the de-identification apparatus 100 may perform an operation corresponding to the operation of the de-identification apparatus 100. On the other hand, when an operation of another apparatus is described, the de-identification apparatus 100 corresponding thereto may perform an operation corresponding to the operation of the other apparatus.

Figure 2:
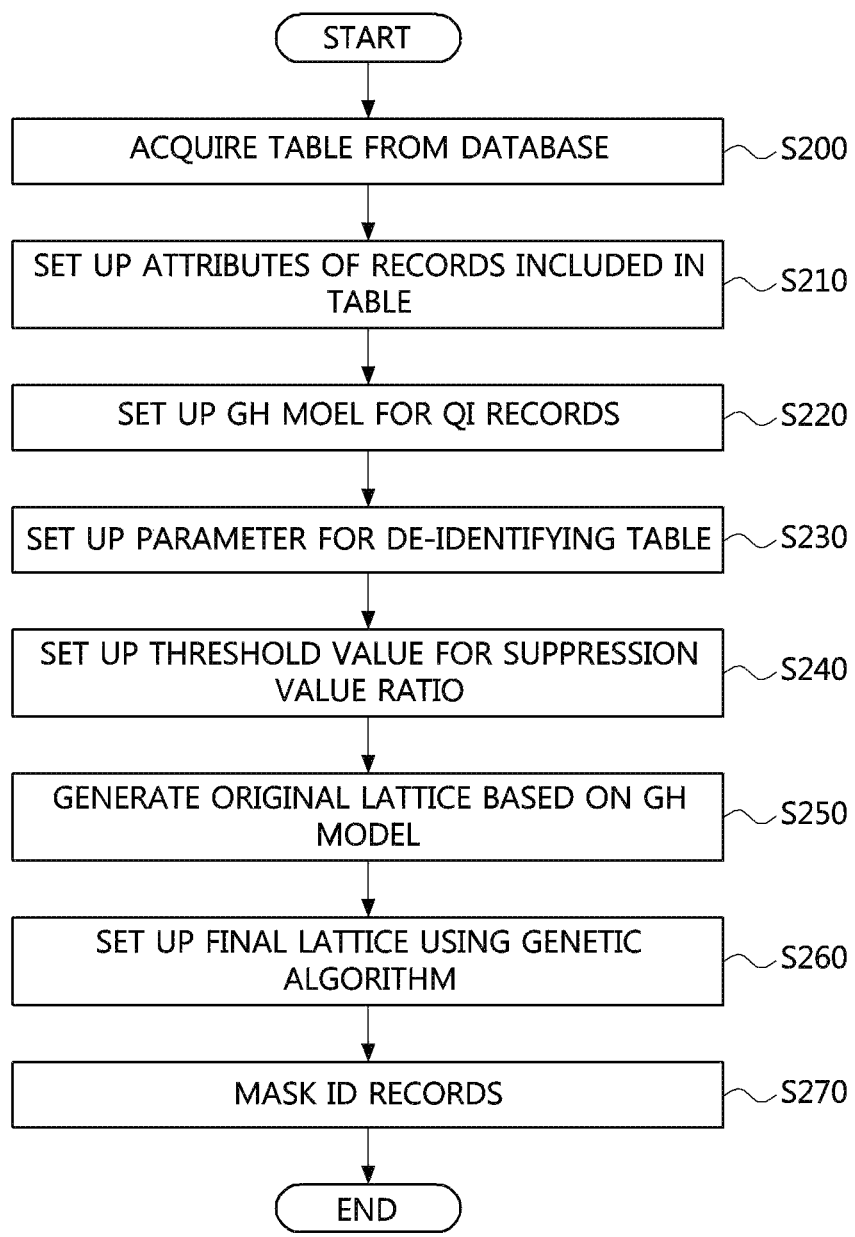
FIG. 2 is a flowchart illustrating an exemplary embodiment of a personal information de-identification method.

FIG. 2 is a flowchart illustrating an exemplary embodiment of a personal information de-identification method.

Referring to FIG. 2, the personal information de-identification method may be performed by the de-identification apparatus 100 (e.g., the processor 110 included in the de-identification apparatus 100) described with reference to FIG. 1. The de-identification apparatus 100 may acquire a table composed of a plurality of records from a database (or a comma-separated values (CSV) file and the like) (S200). Also, original data indicating information other than personal information (hereinafter, referred to as "non-personal information") may be recorded in each of the plurality of records. The database may be located in the de-identification apparatus 100 or another apparatus (e.g., a server).

To acquire the table, the de-identification apparatus 100 may generate access information (e.g., an Internet protocol (IP) address, a port number, an identifier (ID), a system ID (SID), and a password) used for access to the database. Alternatively, the access information may be acquired from a user through the input interface device 140 of the de-identification apparatus 100. The de-identification apparatus 100 may acquire the table composed of the plurality of records from the database when access to the database is approved on the basis of the generated access information.

The de-identification apparatus 100 may set attributes of the respective records included in the table (S210). An attribute of a record may be set as follows.

Figure 3:
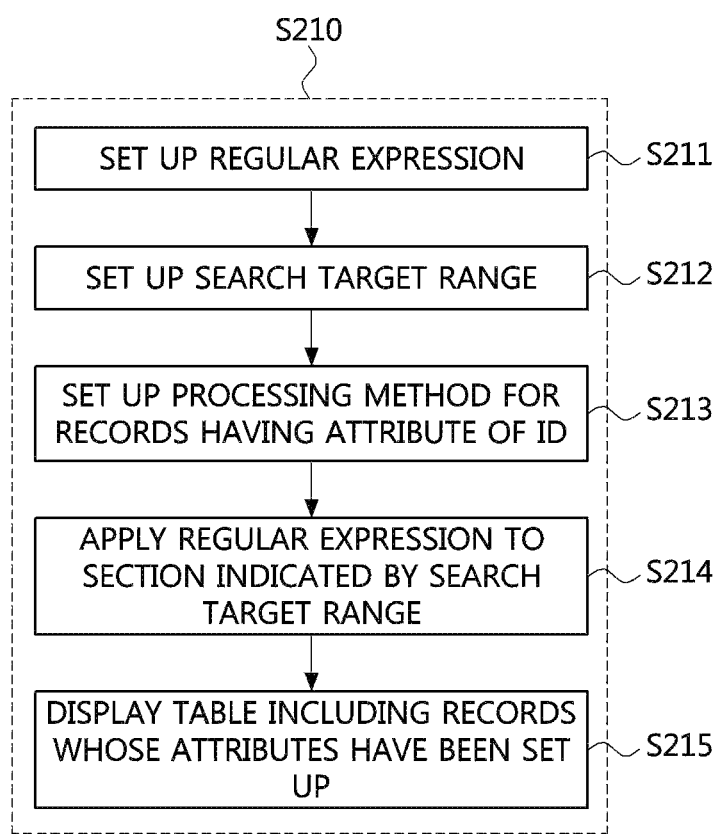
FIG. 3 is a flowchart illustrating an exemplary embodiment of a method of setting up attributes of records.

FIG. 3 is a flowchart illustrating an exemplary embodiment of a method of setting up attributes of records.

Referring to FIG. 3, the de-identification apparatus 100 may set up a regular expression (S211). The regular expression may be used to search for personal information, non-personal information, etc. recorded in records of a table. Therefore, the de-identification apparatus 100 may set up types of personal information to be searched for with the regular expression. The types of personal information may include resident registration number (or passport number or social security number (SSN)), name, address, postal code number, age, nationality, sex, disease, and the like. Also, the de-identification apparatus 100 may set up types of non-personal information to be searched for with the regular expression. The types of non-personal information may include patient number and the like. Type information of personal information and non-personal information may be acquired from a user through the input interface device 140 of the de-identification apparatus 100.

Also, the regular expression may be used to set up attributes of records in which retrieved personal information, non-personal information, etc. are recorded. Attributes of records may be classified as identifier (ID), quasi-identifier (QI), sensitive attribute (SA), insensitive attribute (IA) (or non-SA), and the like. ID may indicate personal information whereby a specific individual is explicitly identified. A specific individual may be identified only one piece of personal information set to ID. For example, the de-identification apparatus 100 may set up the regular expression so that attributes of records in which resident registration numbers, names, addresses, etc. are recorded may be set to ID. QI may indicate personal information whereby a specific individual is inexplicitly identified. A specific individual is not identified with only one piece of personal information set to QI but may be identified with a combination of one piece of personal information set to QI and another piece of personal information. For example, the de-identification apparatus 100 may set up the regular expression so that attributes of records in which postal code numbers, ages, nationalities, sexes, etc. are recorded may be set to QI.

SA may indicate sensitive personal information which requires protection (e.g., personal information having a sensitivity of a preset reference value or higher). When personal information set to SA is made public, a specific individual may have problems with his or her personal affairs. For example, the de-identification apparatus 100 may set the regular expression so that attributes of records in which disease and the like is recorded may be set to SA. IA may indicate insensitive personal information. Alternatively, IA may indicate personal information having a lower sensitivity than SA. When personal information set to IA is made public, no specific individual may have problems with his or her personal affairs. For example, the de-identification apparatus 100 may set up the regular expression so that attributes of records in which postal code numbers, ages, nationalities, sexes, etc. are recorded may be set to IA.

The de-identification apparatus 100 may set a search target range of the table (S212). The search target range may indicate a partial section of the table, and the regular expression set in step S211 may be applied to the section indicated by the search target range. In other words, with only original data within the search target range, it is possible to retrieve types of personal information (or types of non-personal information) indicated by all the original data in the table and determine attributes of records in which the original data is recorded. The search target range may indicate the number of records (e.g., the number of rows in the table). For example, the search target range may be set to 100, 1000, and the like. Step S212 may be omitted as necessary. The search target rage information may be acquired from a user through the input interface device 140 of the de-identification apparatus 100.

The de-identification apparatus 100 may set a processing method for records having the attribute of ID (S213). For example, processing methods for records having the attribute of ID may be classified as follows. In a first processing method, the de-identification apparatus 100 may exclude records having the attribute of ID from the table. Therefore, the table may not include any record having the attribute of ID. In a second processing method, the de-identification apparatus 100 may mask original data recorded in records having the attribute of ID. Therefore, the table may include records having the attribute of ID, and masked data may be recorded in the records having the attribute of ID. In a third processing method, the de-identification apparatus 100 may use original data recorded in records having the attribute of ID as it is.

The de-identification apparatus 100 may apply the regular expression to the section of the table indicated by the search target range (S214). For example, the de-identification apparatus 100 may search for original data corresponding to personal information within the search target range on the basis of the regular expression and check the types of personal information corresponding to retrieved original data. The de-identification apparatus 100 may set up attributes of records on the basis of the checked types of personal information.

Specifically, the de-identification apparatus 100 may set attributes of a residential registration number record (i.e., a record in which original data indicating residential registration numbers is recorded), a name record (i.e., a record in which original data indicating names is recorded), and an address record (i.e., a record in which original data indicating addresses is recorded) included in the table to ID. Records having the attribute of ID may be referred to as "ID record," and thus ID records may include residential registration number records, name records, and address records. The de-identification apparatus 100 may set attributes of postal code records (i.e., a record in which original data indicating postal code numbers is recorded), age records (i.e., a record in which original data indicating ages is recorded), nationality records (i.e., a record in which original data indicating nationalities is recorded), and sex records (i.e., a record in which original data indicating sexes is recorded) included in the table to QI. Records having the attribute of QI may be referred to as "QI record," and thus QI records may include postal code records, age records, nationality records, and sex records.

The de-identification apparatus 100 may set attributes of a disease record (i.e., a record in which original data indicating disease is recorded) included in the table to SA. Records having the attribute of SA may be referred to as "SA record," and thus SA records may include disease records. The de-identification apparatus 100 may set attributes of the postal code records, the age records, the nationality records, and the sex records included in the table to IA. Records having the attribute of IA may be referred to as "IA record," and thus IA records may include the postal code records, the age records, the nationality records, and the sex records. Attributes of the postal code records, the age records, the nationality records, and the sex records included in the table may be set to QI and IA. The table processed in the above-described method may be as follows.

FIG. 4 is a conceptual diagram showing an exemplary embodiment of a table.

Referring to FIG. 4, a table 400 may include a plurality of records. Original data recorded in the respective records may indicate residential registration numbers (or passport numbers or SSNs), names, addresses, postal code numbers, ages, nationalities, sexes, diseases, etc. which are personal information. Residential registration number records, name records, and address records constituting the table 400 may be set to ID records. Postal code records, age records, nationality records, and sex records constituting the table 400 may be set to QI records. A disease record constituting the table 400 may be set to an SA record. The postal code records, the age records, the nationality records, and the sex records constituting the table 400 may be set to IA records.

Referring back to FIG. 3, the de-identification apparatus 100 may process records having the attribute of ID on the basis of the processing method set in step S213. The de-identification apparatus 100 may display the table including the plurality of records whose attributes have been set up through the output interface device 150 (S215). Each of the plurality of records included in the table may indicate original data (i.e., personal information) and the set attribute together. The de-identification apparatus 100 may receive a message indicating a request for a correction of a set attribute from a user and may change the attribute of a corresponding record on the basis of the received message. Subsequently, the de-identification apparatus 100 may display the table including the plurality of records whose attributes have been changed through the output interface device 150. The de-identification apparatus 100 may receive a message indicating that the attributes have been confirmed from a user. In this case, the next step may be performed. The message indicating the request for a correction of an attribute and the message indicating that the attributes have been confirmed may be received through the input interface device 140 of the de-identification apparatus 100.

Referring back to FIG. 2, the de-identification apparatus 100 may set up a generalization hierarchy (GH) model for QI records included in the table (S220). A method of setting up a GH model may be as follows.

Figure 5:
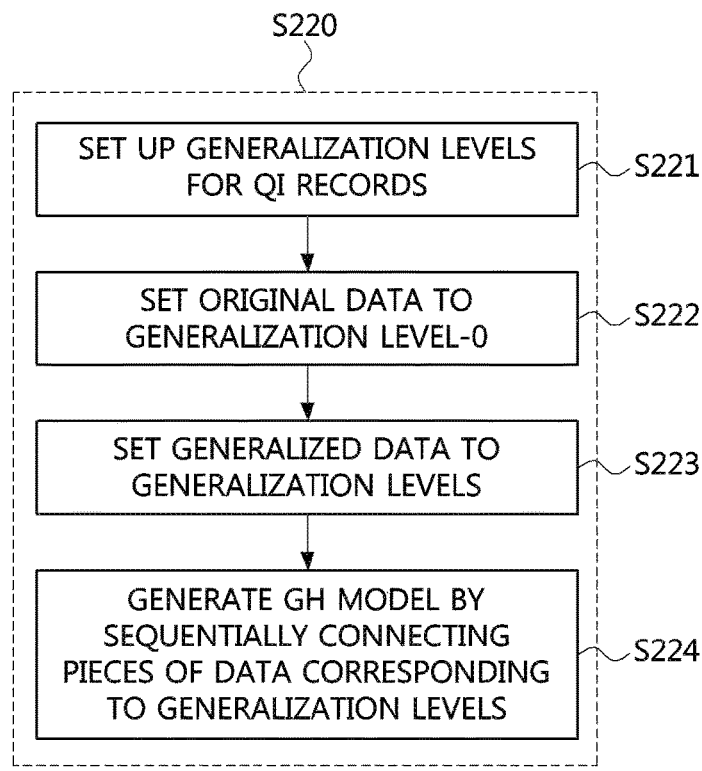
FIG. 5 is a flowchart illustrating an exemplary embodiment of a method of setting up a generalization hierarchy (GH) model.

FIG. 5 is a flowchart illustrating an exemplary embodiment of a method of setting up a GH model.

Referring to FIG. 5, the de-identification apparatus 100 may set up a generalization level for original data recorded in QI records (S221). The de-identification apparatus 100 may set up generalization levels according to the types of QI records (i.e., the postal code record, the age record, the nationality record, and the sex record). For example, the de-identification apparatus 100 may set the range of a generalization level for the postal code record to generalization level-0 to generalization level-2, set the range of a generalization level for the age record to generalization level-0 to generalization level-3, set the range of a generalization level for the nationality record to generalization level-0 to generalization level-2, and set the range of a generalization level for the sex record to generalization level-0 to generalization level-1.

Generalization ranges for original data of the same generalization level may be identical to each other. For example, in the case of generalization level-1, a generalization range may be one digit, and ages "28," "29," "21," and "23" may be generalized into "2*" accordingly. In the case of generalization level-2, a generalization range may be two digits, and postal code numbers "13053" and "13068" may be generalized into "130**" accordingly.

The de-identification apparatus 100 may set the original data recorded in QI records to generalization level-0 (S222). Subsequently, the de-identification apparatus 100 may set up the range of data to be generalized on the basis of the range of a generalization level, generalize the original data on the basis of the range of data to be generalized, and set the generalized data to corresponding generalization levels (e.g., generalization level-1, generalization level-2, and generalization level-3) (S223). The range of generalized data is the smallest at generalization level-0 and may increase together with a generalization level.

The de-identification apparatus 100 may generate a GH model by sequentially connecting data corresponding to a low generalization level and data corresponding to a high generalization level (S224). In the GH model, original data corresponding to generalization level-0 may be present at the lowest hierarchy, generalized data corresponding to generalization level-1 may be present at a higher hierarchy than generalization level-0, generalized data corresponding to generalization level-2 may be present at a higher hierarchy than generalization level-1, and generalized data corresponding to generalization level-3 may be present at a higher hierarchy than generalization level-2. At the highest hierarchy of the GH model, all data may be generalized into one piece of data. Exemplary embodiments of a GH model are as follows.

Figure 6:
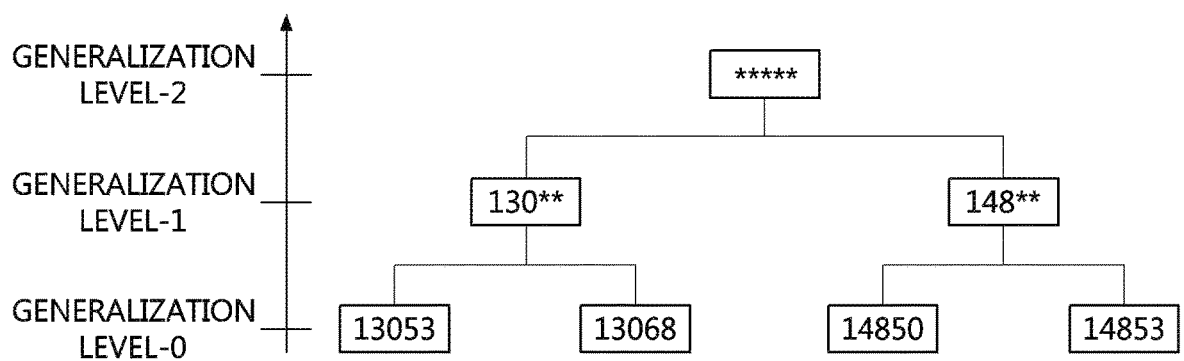
FIG. 6 is a conceptual diagram showing an exemplary embodiment of a GH model for postal code records.

FIG. 6 is a conceptual diagram showing an exemplary embodiment of a GH model for a postal code record.

Referring to FIG. 6, a GH model for the postal code record may be composed of generalization level-0 to generalization level-2. Original data "13053," "13068," "14850," and "14853" recorded in the postal code record may be set to generalization level-0. Among the pieces of original data recorded in the postal code record, "13053" and "13068" may be generalized into "130," and the generalized data "130" may be set to generalization level-1. Among the pieces of original data recorded in the postal code record, "14850" and "14853" may be generalized into "148," and the generalized data "148" may be set to generalization level-1. "130" and "148" corresponding to generalization level-1 may be generalized into "***" (or "1"), and the generalized data "*" (or "1**") may be set to generalization level-2. A GH model for the postal code record is not limited to the above description and may be set up in various ways.

Figure 7:
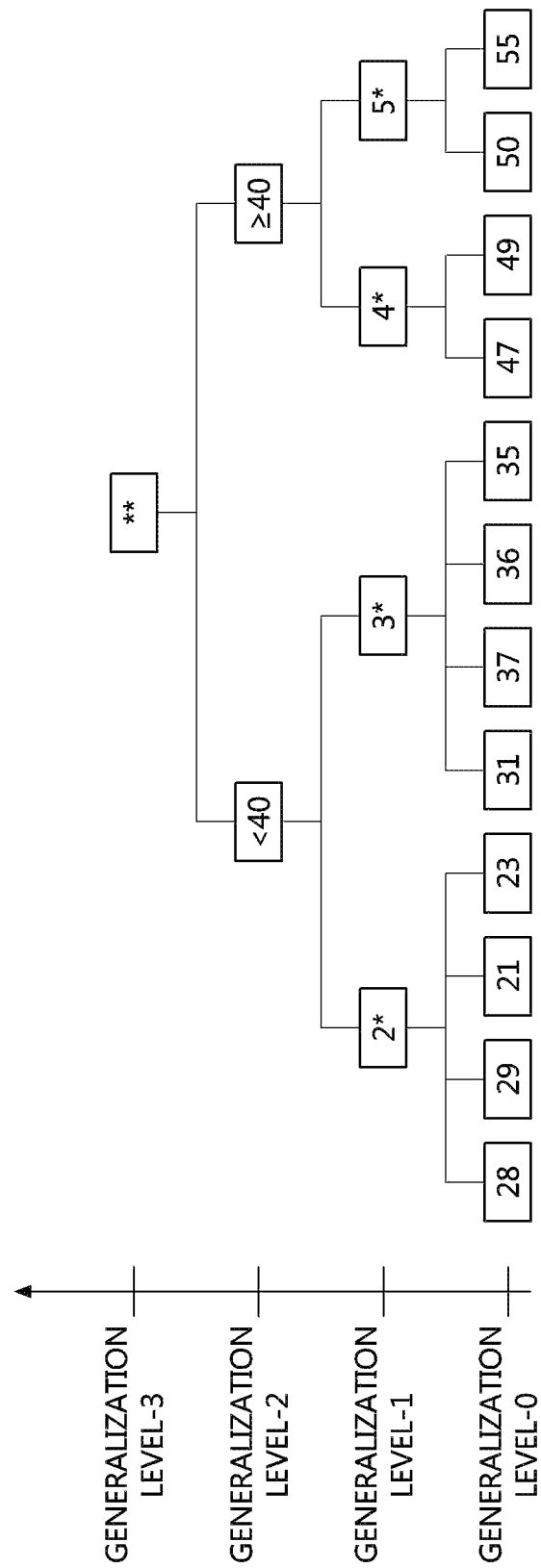
FIG. 7 is a conceptual diagram showing an exemplary embodiment of a GH model for age records.

FIG. 7 is a conceptual diagram showing an exemplary embodiment of a GH model for an age record.

Referring to FIG. 7, a GH model for an age record may be composed of generalization level-0 to generalization level-3. Original data "28," "29," "21," "23," "31," "37," "36," "35," "47," "49," "50," and "55" recorded in the age record may be set to generalization level-0. Among the pieces of original data recorded in the age record, "28," "29," "21," and "23" may be generalized into "2*," and the generalized data "2*" may be set to generalization level-1. Among the pieces of original data recorded in the age record, "31," "37," "36," and "35" may be generalized into "3*," and the generalized data "3*" may be set to generalization level-1. Among the pieces of original data recorded in the age record, "47" and "49" may be generalized into "4*," and the generalized data "4*" may be set to generalization level-1. Among the pieces of original data recorded in the age record, "50" and "55" may be generalized into "5*," and the generalized data "5*" may be set to generalization level-1.

"2*" and "3*" corresponding to generalization level-1 may be generalized into "<40", and the generalized data "<40" may be set to generalization level-2. "4*" and "5*" corresponding to generalization level-1 may be generalized into "AO", and the generalized data "AO" may be set to generalization level-2. "<40" and "AO" corresponding to generalization level-2 may be generalized into "," and the generalized data "" may be set to generalization level-3. A GH model for the age record is not limited to the above description and may be set up in various ways.

Figure 8:
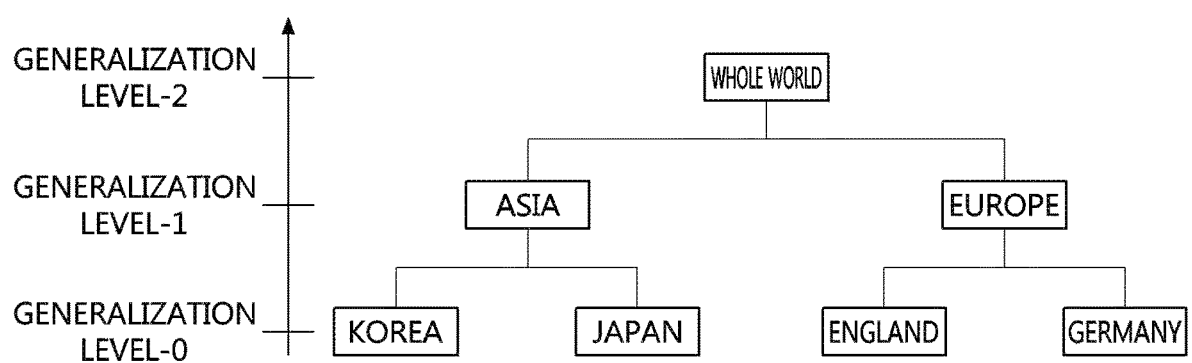
FIG. 8 is a conceptual diagram showing an exemplary embodiment of a GH model for nationality records.

FIG. 8 is a conceptual diagram showing an exemplary embodiment of a GH model for a nationality record.

Referring to FIG. 8, a GH model for nationality records may be composed of generalization level-0 to generalization level-2. Original data "Korea," "Japan," "England," and "Germany" recorded in the nationality record may be set to generalization level-0. Among the pieces of original data recorded in the nationality record, "Korea" and "Japan" may be generalized into "Asia" and the generalized data "Asia" may be set to generalization level-1. Among the pieces of original data recorded in the nationality record, "England" and "Germany" may be generalized into "Europe," and the generalized data "Europe" may be set to generalization level-1. "Asia" and "Europe" corresponding to generalization level-1 may be generalized into "Whole world" (or ""), and the generalized data "Whole world" (or "") may be set to generalization level-2. A GH model for the nationality record is not limited to the above description and may be set up in various ways.

Figure 9:
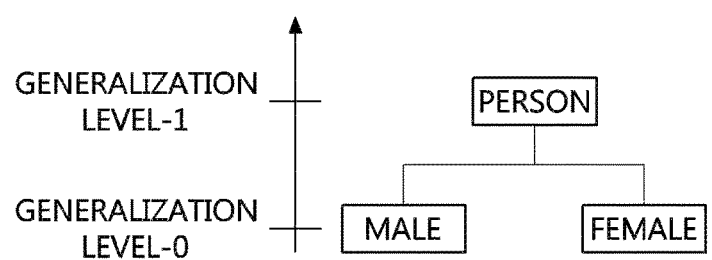
FIG. 9 is a conceptual diagram showing an exemplary embodiment of a GH model for sex records.

FIG. 9 is a conceptual diagram showing an exemplary embodiment of a GH model for a sex record.

Referring to FIG. 9, a GH model for sex records may be composed of generalization level-0 and generalization level-1. Original data "Male" and "Female" recorded in the sex record may be set to generalization level-0. "Male" and "Female" corresponding to generalization level-0 may be generalized into "Person" (or "*") and the generalized data "Person" "*" may be set to generalization level-1. A GH model for the sex record is not limited to the above description and may be set up in various ways.

Referring back to FIG. 2, the de-identification apparatus 100 may set up a parameter used for de-identification of the table (hereinafter, referred to as "de-identification parameter") (S230). The de-identification parameters may include K-anonymity, L-diversity, T-closeness, and the like. K-anonymity, "K-anonymity+L-diversity," or "K-anonymity+T-closeness" may be used to de-identify the table. Therefore, the de-identification apparatus 100 may fundamentally set up K-anonymity and additionally set up L-diversity or T-closeness.

Specifically, the de-identification apparatus 100 may set up a K value of K-anonymity. Alternatively, the de-identification apparatus 100 may acquire a K value of K-anonymity from a user through the input interface device 140 and use the acquired K value of K-anonymity. The K value of K-anonymity may indicate the number of rows constituting an equivalence class.

The table may include at least one equivalence class, and ID records may indicate the same data (e.g., original data or generalized data) in one equivalence class. In other words, ID records in which the same data is recorded and other records related to the corresponding ID records (e.g., QI records, SA records, and IA records) may constitute one equivalence class. The table may be de-identified on the basis of K-anonymity. When the K value of K-anonymity is 4 (i.e., in the case of 4-anonymities), the de-identified table may be as follows.

FIG. 10 is a conceptual diagram showing an exemplary embodiment of a de-identified table.

Referring to FIG. 10, each of equivalence classes may include postal code records, age records, nationality records, sex records, and disease records. The de-identified table 400 shown in FIG. 10 may be obtained by excluding resident registration number records, name records, and address records from the table 400 shown in FIG. 4. In each equivalence class, postal code records may indicate the same data, and age records may indicate the same data.

For example, in equivalence class-1, the postal code record may indicate "130**," and the age record may indicate "<30." In equivalence class-2, the postal code record may indicate "1485*," and the age record may indicate "AO." In equivalence class-3, the postal code record may indicate "130**," and the age record may indicate "3*."

Referring back to FIG. 2, the de-identification apparatus 100 may set up an L value of L-diversity. Alternatively, the de-identification apparatus 100 may acquire an L value of L-diversity from a user through the input interface device 140 and use the acquired L value of L-diversity. The L value of L-diversity may indicate the number of pieces of different data among pieces of data recorded in SA records belonging to each of equivalence classes in the table. In the de-identified table 400 shown in FIG. 11, the L value of L-diversity in equivalence class-1 may be 2 (i.e. the number of different diseases indicated in the disease record), the L value of L-diversity in equivalence class-2 may be 3, and the L value of L-diversity in equivalence class-3 may be 1. The table may be de-identified on the basis of K-anonymity and L-diversity. When the K value of K-anonymity is 4 and the L value of L-diversity is 3 (i.e., in the case of 4-anonymities and 3-diversities), the de-identified table may be as follows.

FIG. 11 is a conceptual diagram showing another exemplary embodiment of a de-identified table.

Referring to FIG. 11, the disease record may indicate three different diseases (i.e., gastritis, bronchitis, and pneumonitis) in equivalence class-1 of the de-identified table 400, indicate three different diseases (i.e., pneumonitis, gastritis, and bronchitis) in equivalence class-2, and indicate three different diseases (i.e., gastritis, bronchitis, and pneumonitis) in equivalence class-3.

Referring back to FIG. 2, the de-identification apparatus 100 may set up a T value of T-closeness. Alternatively, the de-identification apparatus 100 may acquire a T value of T-closeness from a user through the input interface device 140 and use the acquired T value of T-closeness. The table may be de-identified on the basis of K-anonymity, L-diversity, and T-closeness (or K-anonymity and T-closeness). A T value of T-closeness may indicate the distance between pieces of data indicated by SA records belonging to each of equivalence classes in the table. For example, when a table include an annual income record, the table may be de-identified so that the distance (i.e., difference) between annual incomes indicated by the annual record may be the T value of T-closeness or less in each of equivalence classes of the table.

The de-identification apparatus 100 may set up a threshold value for a suppression value ratio (hereinafter, referred to as "suppression threshold value") (S240). Alternative, the de-identification apparatus 100 may acquire a suppression threshold value from a user through the input interface device 140 and use the acquired suppression threshold value. The suppression value ratio may indicate a ratio of equivalence classes which do not satisfy K-anonymity in the de-identified table. Alternatively, the suppression value ratio may indicate a ratio of records which do not satisfy K-anonymity in the de-identified table. The suppression value ratio may be calculated by Equation 1 below.

$$\text{Suppression value ratio (\%)} = \frac{\text{Number of records not satisfying } K\text{-anonymity in de-identified table}}{\text{Total number of records in de-identified table}} \times 100 \quad \text{[Equation 1]}$$

The suppression threshold value may be set to various values. For example, the suppression threshold value may be set to 10%.

The de-identification apparatus 100 may generate an original lattice on the basis of the GH model (S250). The original lattice may include a plurality of nodes, and each of the plurality of nodes may indicate a generalization level indicated by the GH model and a record corresponding to the generalization level. In other words, the de-identification apparatus 100 may set up nodes which indicate generalization levels indicated by the GH model and records corresponding to the generalization levels and may generate an original lattice by connecting the nodes in order of generalization level. An original lattice generated on the basis of the GH model of postal code records shown in FIG. 6, the GH model of age records shown in FIG. 7, and the GH model of sex records shown in FIG. 9 may be as follows.

Figure 12:
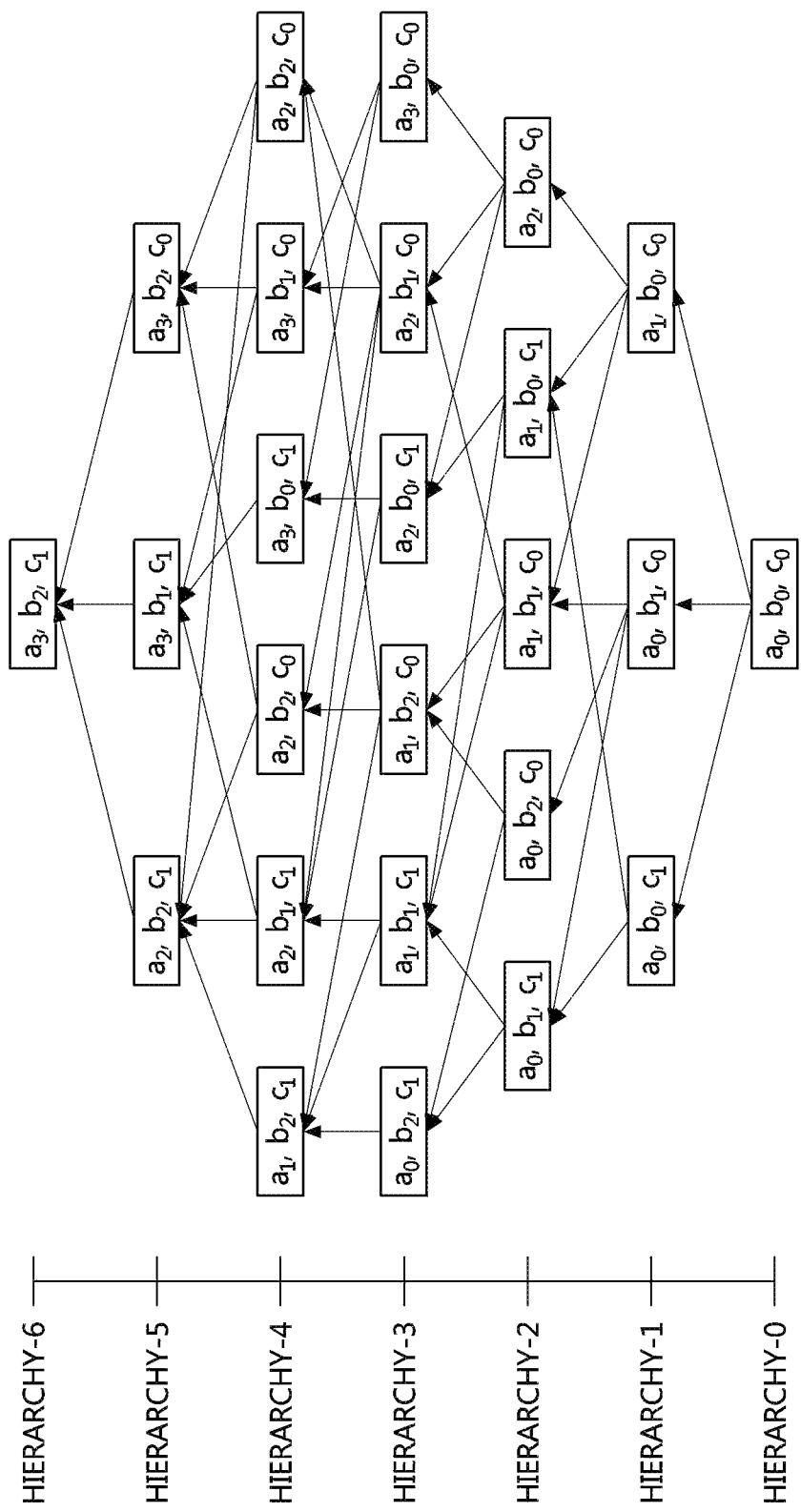
FIG. 12 is a conceptual diagram showing an exemplary embodiment of an original lattice.

FIG. 12 is a conceptual diagram showing an exemplary embodiment of an original lattice.

Referring to FIG. 12, an original lattice may include a plurality of nodes and may be composed of hierarchy-0 to hierarchy-6. At least one node may be present in each of the hierarchies. For example, one node may be present at each of the highest hierarchy (i.e., hierarchy-6) and the lowest hierarchy (i.e., hierarchy-0). Three nodes may be present at each of hierarchy-1 and hierarchy-5. Five nodes may be present at hierarchy-2. Six nodes may be present at each of hierarchy-3 and hierarchy-4.

Here, $a_0$ may indicate age records having generalization level-0 in the GH model shown in FIG. 7, $a_1$ may indicate age records having generalization level-1 in the GH model shown in FIG. 7, $a_2$ may indicate age records having generalization level-2 in the GH model shown in FIG. 7, and $a_3$ may indicate age records having generalization level-3 in the GH model shown in FIG. 7. $b_0$ may indicate portal code records having generalization level-0 in the GH model shown in FIG. 6, $b_1$ may indicate postal code records having generalization level-1 in the GH model shown in FIG. 6, and $b_2$ may indicate postal code records having generalization level-2 in the GH model shown in FIG. 6. $c_0$ may indicate sex records having generalization level-0 in the GH model shown in FIG. 9, and $c_1$ may indicate sex records having generalization level-1 in the GH model shown in FIG. 9.

Therefore, "$a_0$, $b_0$, $c_0$" node may indicate age records having generalization level-0, postal code records having generalization level-0, and sex records having generalization level-0. "$a_1$, $b_0$, $c_0$" node may indicate age records having generalization level-1, postal code records having generalization level-0, and sex records having generalization level-0. "$a_1$, $b_1$, $c_0$" node may indicate age records having generalization level-1, postal code records having generalization level-1, and sex records having generalization level-0.

The de-identification apparatus 100 may set up a final lattice in the original lattice using a genetic algorithm (S260). A method of setting up a final lattice may be as follows.

Figure 13:
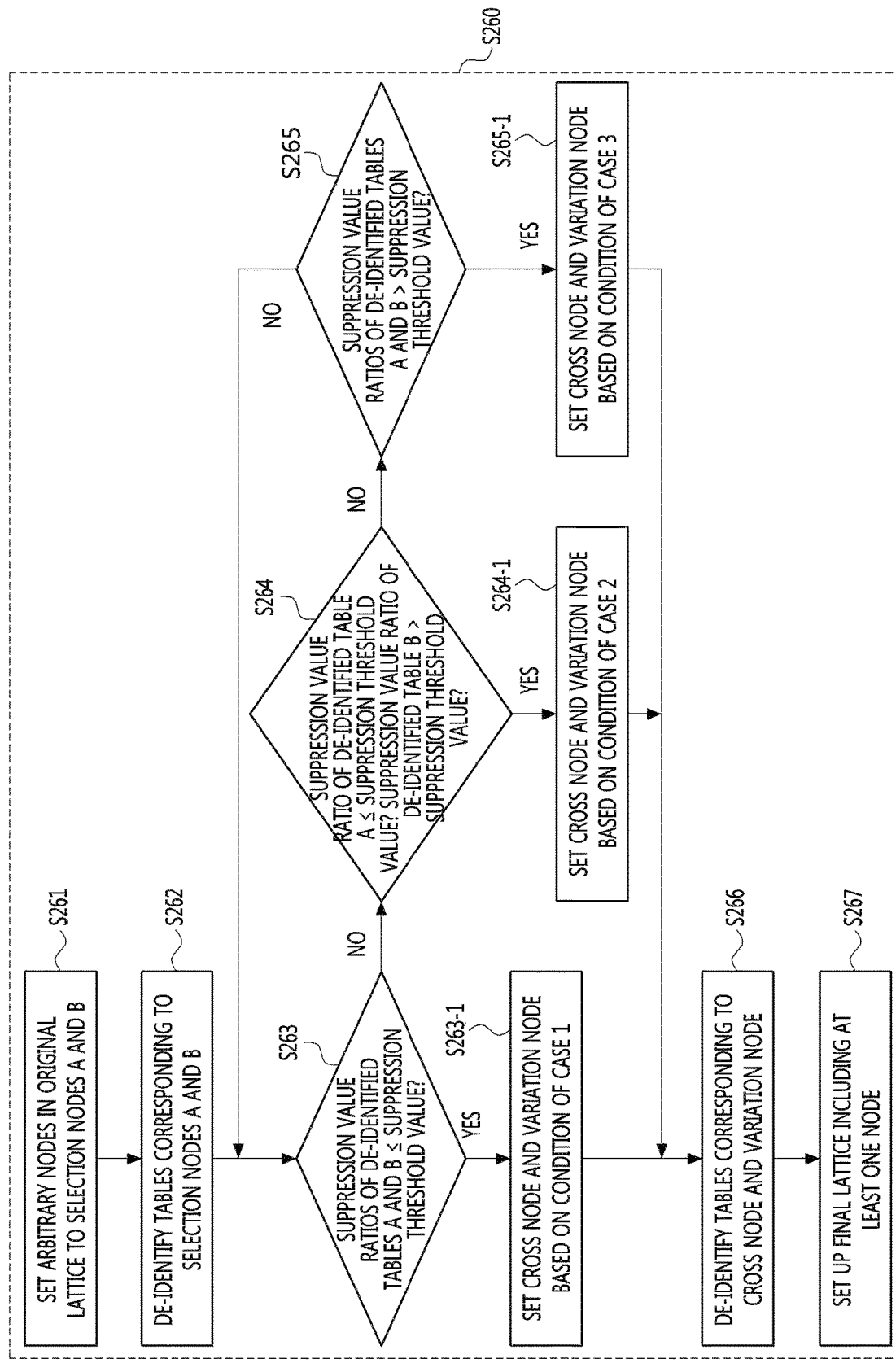
FIG. 13 is a flowchart illustrating a method of setting up a final lattice.

FIG. 13 is a flowchart illustrating a method of setting up a final lattice.

Referring to FIG. 13, the de-identification apparatus 100 may set an arbitrary node to selection node A among nodes belonging to hierarchy-4 corresponding to ⅔ height from the lowest hierarchy in the original lattice shown in FIG. 12 and may set an arbitrary node to selection node B among nodes belonging to hierarchy-2 corresponding to ⅓ height from the lowest hierarchy (S261). Selection node A may be connected to selection node B. For example, the de-identification apparatus 100 may set "$a_2$, $b_2$, $c_0$" node belonging to hierarchy-4 to selection node A and set "$a_1$, $b_1$, $c_0$" node belonging to hierarchy-2 to selection node B.

The de-identification apparatus 100 may de-identify tables separately corresponding to selection node A and selection node B (S262). The de-identification apparatus 100 may generate de-identified tables which satisfy the de-identification parameter (e.g., K-anonymity, L-diversity, and T-closeness) set up in step S230 described above. A de-identification result of the table corresponding to selection node A may be referred to as "de-identified table A," and a de-identification result of the table corresponding to selection node B may be referred to as "de-identified table B."

The de-identification apparatus 100 may determine whether both suppression value ratios of de-identified table A and de-identified table B are the suppression threshold value or less (S263). When both the suppression value ratios of de-identified table A and de-identified table B are the suppression threshold value or less (hereinafter, referred to as "case 1"), the de-identification apparatus 100 may determine a final lattice as follows.

Case 1. Method of Setting Up Final Lattice

The de-identification apparatus 100 may set an arbitrary node to a cross node among nodes belonging to hierarchy-1 which corresponds to ½ height between the lowest hierarchy (i.e., hierarchy-0) and hierarchy-2 to which selection node B belongs in the original lattice and may set an arbitrary node other than selection node B to a variation node among nodes belonging to hierarchy-2 (S263-1). For example, the de-identification apparatus 100 may set "$a_0$, $b_1$, $c_0$" node belonging to hierarchy-1 to a cross node and set "$a_0$, $b_2$, $c_0$" node belonging to hierarchy-2 to a variation node.

The de-identification apparatus 100 may de-identify tables separately corresponding to the cross node and the variation node (S266). In other words, since the suppression value ratio of de-identified table B is the suppression threshold value or less, tables corresponding to nodes belonging to higher hierarchies than selection node B may not be de-identified. The de-identification apparatus 100 may generate a de-identified table which satisfies the de-identification parameter (e.g., K-anonymity, L-diversity, and T-closeness) set up in step S230 described above.

Also, the de-identification apparatus 100 may determine whether suppression value ratios of the de-identified tables generated in step S266 are the suppression threshold value or less. The de-identification apparatus 100 may count the number of nodes which satisfy "suppression value ratio ≤ suppression threshold value" (e.g., selection node B, the cross node, and the variation node).

Step S261 to step S266 may be repeatedly performed until the number of nodes satisfying "suppression value ratio ≤ suppression threshold value" (e.g., selection node B, the cross node, and the variation node) becomes greater than x times the number of nodes (e.g., 6 in FIG. 14) of a hierarchy including the largest number of nodes among the hierarchies constituting the original lattice. Here, x may be a real number greater than 0. For example, x may be set to 0.8, 1, or 1.2. X is not limited to the above description and may be set up in various ways.

For example, an arbitrary node belonging to a hierarchy corresponding to ⅔ height between the lowest hierarchy (i.e., hierarchy-0) and hierarchy-2 to which selection node B belongs may be set to selection node A'. Also, an arbitrary node belonging to a hierarchy corresponding to ⅓ height between the lowest hierarchy (i.e., hierarchy-0) and hierarchy-2 to which selection node B belongs may be set to a selection node B'. Step S262 to step S266 may be performed again on the basis of selection node A' and selection node B'. Such a process may be repeatedly performed until the number of nodes satisfying "suppression value ratio ≤ suppression threshold value" becomes greater than x times the number of nodes of a hierarchy including the largest number of nodes among the hierarchies constituting the original lattice.

The de-identification apparatus 100 may set up a final lattice including nodes which satisfy "suppression value ratio ≤ suppression threshold value" (e.g., selection node B, the cross node, and the variation node) (S267).

Meanwhile, in a case other than case 1, the de-identification apparatus 100 may determine whether the suppression value ratio of de-identified table A is the suppression threshold value or less and whether the suppression value ratio of de-identified table B exceeds the suppression threshold value (S264). When the suppression value ratio of de-identified table A is the suppression threshold value or less and whether the suppression value ratio of de-identified table B exceeds the suppression threshold value (hereinafter, referred to as "case 2"), the de-identification apparatus 100 may select a final lattice as follows.

Case 2. Method of Setting Up Final Lattice

The de-identification apparatus 100 may set an arbitrary node to a cross node among nodes belonging to hierarchy-3 which corresponds to ½ height between hierarchy-4 to which selection node A belongs and hierarchy-2 to which selection node B belongs in the original lattice and may set an arbitrary node other than selection node A to a variation node among nodes belonging to hierarchy-4 (S264-1). For example, the de-identification apparatus 100 may set "$a_1$, $b_1$, $c_1$" node belonging to hierarchy-3 to a cross node and set "$a_2$, $b_1$, $c_1$" node belonging to hierarchy-4 to a variation node.

The de-identification apparatus 100 may de-identify tables separately corresponding to the cross node and the variation node (S266). In other words, since the suppression value ratio of de-identified table B exceeds the suppression threshold value, nodes belonging to lower hierarchies than selection node B may not be de-identified. The de-identification apparatus 100 may generate de-identified tables which satisfy the de-identification parameter (e.g., K-anonymity, L-diversity, and T-closeness) set up in step S230 described above.

Also, the de-identification apparatus 100 may determine whether suppression value ratios of the de-identified tables generated in step S266 are the suppression threshold value or less. The de-identification apparatus 100 may count the number of nodes which satisfy "suppression value ratio suppression threshold value" (e.g., selection node A, the cross node, and the variation node).

Step S261 to step S266 may be repeatedly performed until the number of nodes satisfying "suppression value ratio suppression threshold value" (e.g., selection node A, the cross node, and the variation node) becomes greater than x times the number of nodes (e.g., 6 in FIG. 14) of a hierarchy including the largest number of nodes among the hierarchies constituting the original lattice. Here, x may be a real number greater than 0. For example, x may be set to 0.8, 1, or 1.2. X is not limited to the above description and may be set up in various ways.

For example, an arbitrary node belonging to a hierarchy corresponding to ⅔ height between hierarchy-4 to which selection node A belongs and hierarchy-2 to which selection node B belongs may be set to selection node A'. Also, an arbitrary node belonging to a hierarchy corresponding to ⅓ height between hierarchy-4 to which selection node A belongs and hierarchy-2 to which selection node B belongs may be set to a selection node B'. Step S262 to step S266 may be performed again on the basis of selection node A' and selection node B'. Such a process may be repeatedly performed until the number of nodes satisfying "suppression value ratio suppression threshold value" becomes greater than x times the number of nodes of a hierarchy including the largest number of nodes among the hierarchies constituting the original lattice.

The de-identification apparatus 100 may set up a final lattice including nodes which satisfy "suppression value ratio suppression threshold value" (e.g., selection node A, the cross node, and the variation node) (S267).

Meanwhile, in a case other than case 1 or case 2, the de-identification apparatus 100 may determine whether both the suppression value ratios of de-identified table A and the de-identified table B exceed the suppression threshold value (S265). When both the suppression value ratios of de-identified table A and de-identified table B exceed the suppression threshold value (hereinafter, referred to as "case 3"), the de-identification apparatus 100 may select a final lattice as follows.

Case 3. Method of setting up final lattice

The de-identification apparatus 100 may set an arbitrary node to a cross node among nodes belonging to hierarchy-5 which corresponds to ½ height between hierarchy-4 to which selection node A belongs and the highest hierarchy (i.e., hierarchy-6) in the original lattice and may set an arbitrary node other than selection node A to a variation node among nodes belonging to hierarchy-4 (S265-1). For example, the de-identification apparatus 100 may set "$a_3$, $b_1$, $c_1$" node belonging to hierarchy-5 to a cross node and set "$a_2$, $b_1$, $c_1$" node belonging to hierarchy-4 to a variation node.

The de-identification apparatus 100 may de-identify tables separately corresponding to the cross node and the variation node (S266). The de-identification apparatus 100 may generate de-identified tables which satisfy the de-identification parameter (e.g., K-anonymity, L-diversity, and T-closeness) set up in step S230 described above.

Also, the de-identification apparatus 100 may determine whether suppression value ratios of the de-identified tables generated in step S266 are the suppression threshold value or less. The de-identification apparatus 100 may count the number of nodes which satisfy "suppression value ratio suppression threshold value" (e.g., the cross node and the variation node).

Step S261 to step S266 may be repeatedly performed until the number of nodes satisfying "suppression value ratio suppression threshold value" (e.g., the cross node and the variation node) becomes greater than x times the number of nodes (e.g., 6 in FIG. 14) of a hierarchy including the largest number of nodes among the hierarchies constituting the original lattice. Here, x may be a real number greater than 0. For example, x may be set to 0.8, 1, or 1.2. X is not limited to the above description and may be set up in various ways.

For example, an arbitrary node belonging to a hierarchy corresponding to ⅔ height between hierarchy-4 to which selection node A belongs and the highest hierarchy (i.e., hierarchy-6) may be set to selection node A'. Also, an arbitrary node belonging to a hierarchy corresponding to ⅓ height between hierarchy-4 to which selection node A belongs and the highest hierarchy (i.e., hierarchy-6) may be set to a selection node B'. Step S262 to step S266 may be performed again on the basis of selection node A' and selection node B'. Such a process may be repeatedly performed until the number of nodes satisfying "suppression value ratio suppression threshold value" becomes greater than x times the number of nodes of a hierarchy including the largest number of nodes among the hierarchies constituting the original lattice.

The de-identification apparatus 100 may set up a final lattice including nodes which satisfy "suppression value ratio suppression threshold value" (e.g., the cross node and the variation node) (S267).

Also, the de-identification apparatus 100 may display the final lattice through the output interface device 150, store the final lattice in the storage device 160 (or a database), and transmit the final lattice to another device through the network interface device 130.

Referring back to FIG. 2, the de-identification apparatus 100 may mask the whole or a partial range of original data recorded in ID records included in the de-identified table (S270). For example, when a range to be masked is previously set up in the original data recorded in ID records, the preset range may be masked. When a range to be masked is not previously set up in the original data recorded in ID records, the whole range may be masked. Step S270 is not essential for the personal information de-identification method and may be omitted as necessary. An exemplary embodiment of a table including masked records is as follows.

FIG. 14 is a conceptual diagram showing an exemplary embodiment of a table including masked records.

Referring to FIG. 14, a partial range of original data recorded in residential registration number records included in the table 400 may be masked. For example, a range following "-" in the original data recorded in the residential registration number records may be masked. The whole range of original data recoded in the name records included in the table 400 may be masked. A partial range of original data recorded in the address records included in the table 400 may be masked. For example, a range followed by "Seoul" in the original data recorded in the address records may be masked.

Next, a parameter indicating a risk of a de-identified table is described.

A re-identification risk may be indicated by a reciprocal of the number of rows constituting equivalence classes of the de-identified table. The re-identification risk may vary according to the maximum, minimum, and average number of rows constituting the equivalence classes.

A sample risk may be calculated by Equation 2 below.

$$\text{Sample risk (\%)} = \frac{\text{Number of records whose equivalence class has cardinality of 1}}{\text{Total number of records}} \times 100 \quad \text{[Equation 2]}$$

TABLE 1

| Sample rate | Group size | Group risk |
|---|---|---|
| 0.01 | 3016200 | 11.98% |
| 0.1 | 301620 | 23.91% |
| 0.2 | 150810 | 31.13% |
| 0.3 | 100540 | 33.99% |
| 0.4 | 75405 | 36.37% |
| 0.5 | 60324 | 38.45% |
| 0.6 | 50270 | 40.32% |
| 0.7 | 43088 | 42.03% |
| 0.8 | 37702 | 43.62% |
| 0.9 | 33513 | 44.76% |

Next, a parameter indicating a utility of a de-identified table is described. Precision may be used to measure a precision of each node belonging to a lattice and may indicate an average height of a GH model. In a GH model, a higher generalization level may indicate lower precision and greater data loss. A precision may be calculated by Equation 3 below.

$$Prec(GT) = 1 - \frac{\sum_{i=1}^{N_A}\sum_{j=1}^{N_A}\frac{GHL_{A_i}}{|DGH_{A_i}|}}{N_A \times N} \quad \text{[Equation 3]}$$

Prec(GT) may indicate a precision of a generalization table (GT) (i.e., a de-identified table). $N_A$ may indicate the number of variables belonging to the table (e.g., postal code number, age, nationality, sex, and disease in FIG. 11). N may indicate the number of rows constituting the table. $GHL_{A_i}$ may indicate a generalization level of a corresponding variable in a GH model. $|DGH_{A_i}|$ may indicate a maximum value of a generalization level of the corresponding variable in the GH model.

A discernability metric may be a parameter in which the sizes of equivalence classes, a generalization level in a GH model, etc. are taken into consideration. The discernability metric may indicate a capability of discerning pieces of generalized data in an equivalence class. The discernability metric may be calculated by Equation 4 below.

$$DM = \sum_{f_i \geq k}(f_i)^2 + \sum_{f_i < k}(N \times f_i) \quad \text{[Equation 4]}$$

DM may indicate the discernability metric. fi may indicate the sizes of equivalence classes. k may indicate the number of equivalence classes. N may indicate the number of rows (e.g., rows constituting a table).

An entropy may indicate a capability of discerning pieces of generalized data or the amount of information in an equivalence class. The entropy may be calculated by Equation 5 below.

$$Pr(a_r | b_{x'}) = \underbrace{\sum_{i=1}^{n}\sum_{j=1}^{J}\log_2(Pr(R_{ij} | R'_{ij}))}_{\text{Non-uniformed entropy information loss}} \quad \text{[Equation 5]}$$

$Pr(a_r|b_{r'})$ may indicate the entropy. $a_r$ may indicate original data. $b_r$ may indicate generalized data. $R_{ij}$ may indicate a record in which the original data is recorded. R'ij may indicate a record in which generalized data is recorded. I may indicate an indicator function.

Meanwhile, the de-identification apparatus 100 may display risk parameters (e.g., a re-identification risk, a sample risk, and a group risk) of nodes belonging to the final lattice and utility parameters (e.g., a precision, a discernability metric, and an entropy) through the output interface device 150. Also, the de-identification apparatus 100 may display tables corresponding to the nodes belonging to the final lattice before and after de-identification (i.e., comparison results between the original table and the de-identified table) through the output interface device 150.

Methods according to the present invention may be implemented in the form of a program command form, which may be executed through various computing means, and recorded on a computer-readable medium. The computer-readable medium may include a program command, a data file, a data structure, etc. solely or in combination. The program command recorded on the medium may be specially designed and constructed for the present invention or may be known and available to those of ordinary skill in the art of computer software.

An example of the computer-readable medium includes a hardware device specifically configured to store and execute a program command such as a ROM, a RAM, and a flash memory. An example of the program command may include a machine language code generated by a compiler but also a high-level language code which may be executed by a computer using an interpreter and the like. The aforementioned hardware device may be configured to operate as at least one software module so as to perform an operation of the present invention, and vice versa.

While the present invention has been described above with reference to exemplary embodiments, it will be understood by those of ordinary skill in the art that various modifications and alterations can be made without departing from the scope of the present invention defined by the following claims.

What is claimed is:

1. A personal information de-identification method performed by a personal information de-identification apparatus, the method comprising:
   acquiring an original table including records in which original data indicating personal information is recorded from a database;
   classifying respective records included in the original table based on attributes of the respective records, wherein the respective records are classified as one of classes of identifier (ID), quasi-identifier (QI), sensitive attribute (SA), and insensitive attribute (IA);
   generalizing the original data recorded in the respective records included in the original table based on generalization levels;
   setting up a generalization hierarchy model composed of the original data and the generalized data;
   generating an original lattice including a plurality of candidate nodes indicating tables, which indicate generalization levels for types of personal information, based on a hierarchical structure indicated by the generalization hierarchy model; and
   setting up a final lattice including one or more candidate nodes which satisfy a preset requirement among the plurality of candidate nodes included in the original lattice,
   wherein a de-identified table generated in the generalizing of the original data is generated based on K-anonymity, generated based on K-anonymity and L-diversity, or generated based on K-anonymity and T-closeness, and
   wherein the preset requirement includes a preset suppression requirement, which indicates a ratio of equivalence classes which do not satisfy a preset K-anonymity to equivalence classes constituting the de-identified table.

2. The personal information de-identification method of claim 1, wherein the classifying respective records includes searching for personal information in the original table with regular expressions and setting up one of the classes for the respective records.

3. The personal information de-identification method of claim 1, further comprising calculating a re-identification risk and a utility of a de-identified table corresponding to at least one final node included in the final lattice.

4. The personal information de-identification method of claim 1, further comprising masking some or all of original data in records indicated by the identifier (ID) among the records included in the original table, or deleting original data in records indicated by the identifier (ID).

5. The personal information de-identification method of claim 1, wherein the setting up of the final lattice comprises:
   selecting one or more candidate nodes from among the plurality of candidate nodes included in the original lattice;
   generating de-identified tables by de-identifying the original table based on generalization levels indicated by the one or more candidate nodes;
   setting a candidate node corresponding to a de-identified table satisfying a preset suppression requirement to a final node; and
   setting up the final lattice including the final node corresponding to the candidate node satisfying the preset requirement.

6. The personal information de-identification method of claim 1, wherein at least one of:
   the identifier (ID) indicates an equivalence class including a record in which original data indicating personal information whereby a specific individual is explicitly identified is recorded;
   the quasi-identifier (QI) indicates an equivalence class including a record in which original data indicating personal information whereby a specific individual is inexplicitly identified is recorded;
   the sensitive attribute (SA) indicates an equivalence class including a record in which original data indicating personal information having a sensitivity of a preset reference value or higher is recorded; and
   the insensitive attribute (IA) indicates an equivalence class including a record in which original data indicating personal information having a lower sensitivity than sensitive attribute (SA) is recorded.

7. A personal information de-identification method performed by a personal information de-identification apparatus, the method comprising:
   acquiring an original table including records in which original data indicating personal information is recorded from a database;
   searching for personal information in the original table with regular expressions;
   setting up respective records included in the original table as one of classes of identifier (ID), quasi-identifier (QI), sensitive attribute (SA), and insensitive attribute (IA) based on attributes of the respective records according to results of the searching; and
   generalizing the original data recorded in the respective records included in the original table based on generalization levels,
   wherein a de-identified table generated in the generalizing of the original data is generated based on K-anonymity, generated based on K-anonymity and L-diversity, or generated based on K-anonymity and T-closeness, and
   wherein the preset requirement includes a preset suppression requirement, which indicates a ratio of equivalence classes which do not satisfy a preset K-anonymity to equivalence classes constituting the de-identified table.

8. The personal information de-identification method of claim 7, further comprising setting up a generalization hierarchy model composed of the original data and the generalized data.

9. The personal information de-identification method of claim 8, further comprising generating an original lattice including a plurality of candidate nodes indicating tables, which indicate generalization levels for types of personal information, based on a hierarchical structure indicated by the generalization hierarchy model.

10. The personal information de-identification method of claim 9, further comprising setting up a final lattice including one or more candidate nodes which satisfy a preset requirement among the plurality of candidate nodes included in the original lattice.

11. The personal information de-identification method of claim 7, further comprising calculating a re-identification risk and a utility of a de-identified table corresponding to at least one final node included in the final lattice.

12. The personal information de-identification method of claim 7, further comprising masking some or all of original data in records indicated by the identifier (ID) among the records included in the original table, or deleting original data in records indicated by the identifier (ID).

13. The personal information de-identification method of claim 7, wherein the setting up of the final lattice comprises:
- selecting one or more candidate nodes from among the plurality of candidate nodes included in the original lattice;
- generating de-identified tables by de-identifying the original table based on generalization levels indicated by the one or more candidate nodes;
- setting a candidate node corresponding to a de-identified table satisfying a preset suppression requirement to a final node; and
- setting up the final lattice including the final node corresponding to the candidate node satisfying the preset requirement.

14. A personal information de-identification apparatus comprising:
- a processor; and
- a memory configured to store at least one command executed by the processor,
- wherein the at least one command is executable to:
    - acquire an original table including records in which original data indicating personal information is recorded from a database;
    - search for personal information in the original table on the basis of regular expressions;
    - set up respective records included in the original table as one of classes of identifier (ID), quasi-identifier (QI), sensitive attribute (SA), and insensitive attribute (IA) based on attributes of the respective records according to results of the search; and
    - generalize the original data recorded in the respective records included in the original table based on generalization levels,
- wherein a de-identified table generated in the generalizing of the original data is generated based on K-anonymity, generated based on K-anonymity and L-diversity, or generated based on K-anonymity and T-closeness, and
- wherein the preset requirement includes a preset suppression requirement, which indicates a ratio of equivalence classes which do not satisfy a preset K-anonymity to equivalence classes constituting the de-identified table.

15. The personal information de-identification apparatus of claim 14, wherein at least one command is further executable to:
- set up a generalization hierarchy model composed of the original data and the generalized data;
- generate an original lattice including a plurality of candidate nodes indicating tables, which indicate generalization levels for types of personal information, based on a hierarchical structure indicated by the generalization hierarchy model; and
- set up a final lattice including one or more candidate nodes which satisfy a preset requirement among the plurality of candidate nodes included in the original lattice.

* * * * *